US009517695B2

(12) United States Patent
Mayer et al.

(10) Patent No.: US 9,517,695 B2
(45) Date of Patent: Dec. 13, 2016

(54) MOVABLE DISPLAY OF INFORMATION IN A MOTOR VEHICLE

(71) Applicant: AUDI AG, Ingolstadt (DE)

(72) Inventors: Stefan Mayer, Gaimersheim (DE); Christine Ullmann, Weichering (DE); Paul Sprickmann Kerkerinck, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/899,246

(22) PCT Filed: Aug. 7, 2014

(86) PCT No.: PCT/EP2014/002169
§ 371 (c)(1),
(2) Date: Dec. 17, 2015

(87) PCT Pub. No.: WO2015/018525
PCT Pub. Date: Feb. 12, 2015

(65) Prior Publication Data
US 2016/0144717 A1    May 26, 2016

(30) Foreign Application Priority Data

Aug. 9, 2013   (DE) .................. 10 2013 013 326

(51) Int. Cl.
G09G 5/00      (2006.01)
B60K 37/02     (2006.01)
(Continued)

(52) U.S. Cl.
CPC ............. B60K 37/02 (2013.01); B60K 37/06 (2013.01); G01C 21/36 (2013.01); G06F 3/1423 (2013.01);
(Continued)

(58) Field of Classification Search
CPC ....... G06F 3/1423; G09G 3/003; G09G 5/005; G09G 2360/04; G09G 2370/20; G09G 2380/10; G01C 21/3664; B60K 37/02; B60K 2350/1068; B60K 2350/352; B60W 50/143; B60W 50/146
See application file for complete search history.

(56) References Cited

U.S. PATENT DOCUMENTS 6,697,721 B2 *  2/2004  Arlinsky ............... B60K 35/00
                                                      345/7
6,721,634 B1    4/2004  Hauler et al.
(Continued)

FOREIGN PATENT DOCUMENTS

CN   102177041 A   9/2011
CN   102470757 A   5/2012
(Continued)

OTHER PUBLICATIONS

International Search Report for PCT/EP2014/002169, mailed on Jan. 29, 2015, 2 pp.
(Continued)

Primary Examiner — Joe H Cheng
(74) Attorney, Agent, or Firm — Staas & Halsey LLP

(57) ABSTRACT

At least one display device in a motor vehicle displays graphic information from graphic applications that generate, independently of one another, display contents for an information data set. The graphic applications synchronize themselves by exchanging the information data set or by mutual referencing to the information data set, with the result that firstly one of the applications generates and displays its display content for the information data set in a first region, and then another of the applications generates its display content for the information data set and displays its display content in another region in the passenger compartment. A signaling device signals the synchronization by at least one
(Continued)

optical and/or acoustic signal, which is different from the display contents, in the passenger compartment.

22 Claims, 1 Drawing Sheet

(51) Int. Cl.
  *B60K 37/06* (2006.01)
  *G01C 21/36* (2006.01)
  *G06F 3/14* (2006.01)
  *G09G 3/00* (2006.01)
(52) U.S. Cl.
  CPC ....... *G09G 3/003* (2013.01); *B60K 2350/1068* (2013.01); *B60K 2350/352* (2013.01); *B60K 2350/965* (2013.01); *G09G 2354/00* (2013.01); *G09G 2360/04* (2013.01); *G09G 2370/20* (2013.01); *G09G 2380/10* (2013.01)

(56) References Cited

U.S. PATENT DOCUMENTS

| | | | | |
|---|---|---|---|---|
| 7,126,583 | B1* | 10/2006 | Breed | B60K 35/00 345/158 |
| 7,764,247 | B2* | 7/2010 | Blanco | G01C 21/365 345/7 |
| 8,412,413 | B1* | 4/2013 | Stark | G02B 27/01 340/980 |
| 8,477,108 | B2* | 7/2013 | Waller | 345/156 |
| 2004/0117084 | A1* | 6/2004 | Mercier | B60K 37/06 701/36 |
| 2005/0154505 | A1* | 7/2005 | Nakamura | G01C 21/365 701/1 |
| 2005/0278113 | A1* | 12/2005 | Maruyama | G08G 1/096783 701/436 |
| 2007/0085708 | A1 | 4/2007 | Kato et al. | |
| 2009/0027332 | A1* | 1/2009 | Cieler | B60K 35/00 345/156 |
| 2011/0257973 | A1* | 10/2011 | Chutorash | G01C 21/3661 704/235 |
| 2013/0076615 | A1* | 3/2013 | Iao | G06F 3/017 345/156 |
| 2015/0046028 | A1* | 2/2015 | Sprickmann Kerkerinck | B60K 35/00 701/36 |

FOREIGN PATENT DOCUMENTS

| | | |
|---|---|---|
| CN | 103221784 A | 7/2013 |
| DE | 199 50 155 C1 | 5/2001 |
| DE | 103 43 199 A1 | 4/2005 |
| DE | 10 2013 013 326 | 8/2013 |
| WO | PCT/EP2014/002169 | 8/2014 |

OTHER PUBLICATIONS

English translation of Written Opinion for International Application No. PCT/EP2014/002169 mailed Jan. 29, 2015.
English translation of International Preliminary Report on Patentability for International Application PCT/EP2014/002169 mailed Feb. 18, 2016.

* cited by examiner

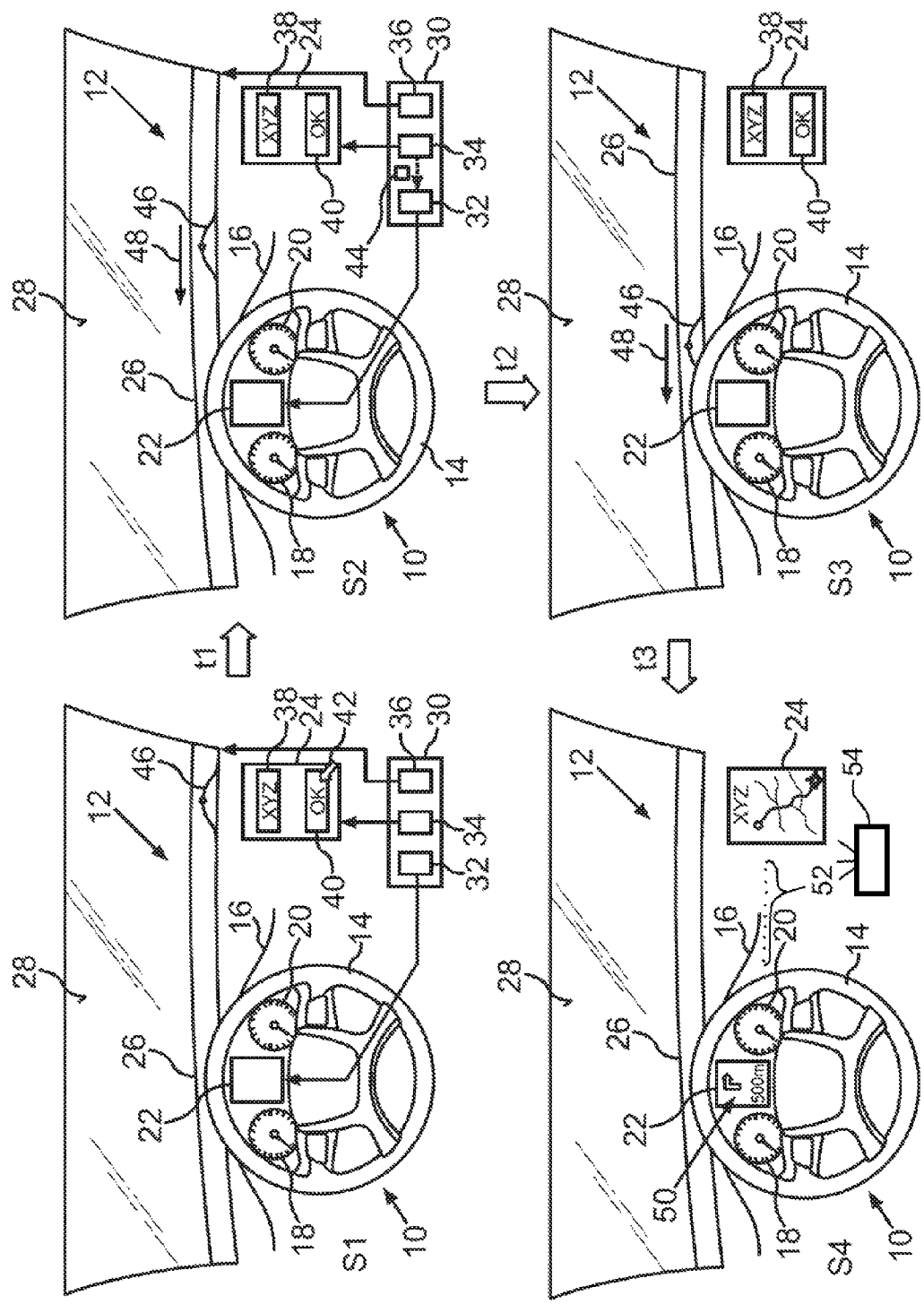

MOVABLE DISPLAY OF INFORMATION IN A MOTOR VEHICLE

CROSS REFERENCE TO RELATED APPLICATIONS

This application is based on and hereby claims priority to International Application No. PCT/EP2014/002169 filed on Aug. 7, 2014 and German Application No. 10 2013 013 326.2 filed on Aug. 9, 2013, the contents of which are hereby incorporated by reference.

BACKGROUND

The invention relates to a motor vehicle having at least one display device, for example a screen, and having at least two applications, each of which can be, for example, a software application. The applications successively generate a display content from an information data set and in each case display their display content in a region of the passenger compartment by the at least one display device. The applications exchange the information data set with one another, i.e., information from the same information data set appears successively in the different regions of the passenger compartment.

A typical application of this type is the display of a warning message in a motor vehicle. It can therefore be provided that firstly, for example, a warning signal which lights up in red is displayed in a combination instrument behind a steering wheel if, for example, a temperature of an engine oil is higher than a threshold value. This warning signal can be generated by a first application which is responsible for a screen of the combination instrument.

In order to make more precise information about the problem available to the driver, an application for controlling a combination instrument can make available an information data set with the warning message to, for example, an application for a screen in the center console of the motor vehicle. This second application can be, for example, a component of the Infotainment system of the motor vehicle. The second application can then display, for example, a text with a detailed warning message on the screen of the center console. For this purpose, signal colors, that is to say for example letters which light up in red again, are generally used again.

From a driver's point of view this may, however, mean that he perceives two warning messages which light up in red, specifically one in the combination instrument and one on the center console, in brief succession one after the other, that is to say for example in a time interval of one second, during a journey. If he then averts his gaze from the events on the road, he wastes valuable time on perceiving that both warning messages relate to the same warning message, specifically the high temperature in this example. The driver's gaze is therefore averted from the events on the road for an unnecessarily long time.

Another application is the setting of a destination on a navigation assistance system and the subsequent display of driving messages, for example in the head-up display of the motor vehicle. The driver selects a new destination on a screen and confirms the selection. For this purpose, a first application, for example a control program of the Infotainment system, can display to him a corresponding operator control menu on the screen. On the head-up display, for example an arrow for the next driving maneuver, that is to say for example traveling straight ahead or turning off to the right, is then displayed to the driver by a second application.

However, in this context the driver cannot be certain whether the displayed arrow is already associated with the navigation to his new destination or whether it is still based on the old destination because, for example, the route calculation for the new destination is still running.

In the related art there is therefore the problem that it is not clear to a driver whether the information displayed by different applications of a motor vehicle are associated with one another, i.e., whether the applications have synchronized. There is therefore a lack of system transparency.

SUMMARY

One possible object relates to making available a possibility in a motor vehicle to be able to signal the synchronous operation of two applications.

The motor vehicle described herein has at least one display device on which applications can display graphic information in a passenger compartment of the motor vehicle. A display device can be, for example, a screen. The quantity from the at least one display device can comprise, in particular, at least one of the following elements: a combination instrument, a windshield base display, a screen in a center console, a screen in a dashboard, a head-up display. A windshield base display is a strip-shaped screen which is known per se from the related art and is made available at the bottom of a windshield and has a longitudinal extent in the transverse direction of the vehicle of at least a third, in particular at least half, of the width of the windshield.

The specified applications can each comprise a control unit and/or a program module of a control unit or of a central processing unit or of an Infotainment system. Each application respectively generates graphic data, that is to say control data for defining the graphic information, i.e., for defining its display content, which is displayed on the at least one display unit.

The applications generate their display contents from an information data set, that is to say from a predetermined quantity of one or more computer-readable digital values and/or characters. The applications exchange this information data set in accordance with an embodiment, i.e., one of the applications transmits the information data set to at least one other application. Alternatively, it is also possible to provide that the applications mutually reference the information data set which is to be used as the basis for the display content, i.e., one of the applications transmits referencing data to at least one other application. The information data set can then be stored in a memory which is jointly accessible to all applications or said information data set can be generated and updated, for example by a control unit, from a data source which is accessible to all applications. Overall, the applications therefore synchronize themselves by exchanging the information data set or by the referencing to the information data set.

Since all the display contents are based on the same information data set, firstly a first display content is generated from the information data set by one of the applications and displayed, and then a second display content is generated from the information data set by another of the applications and displayed in another region in the passenger compartment. As already described, this results, for example, in a warning symbol (first data content) appearing in the combination instrument and then a text appearing as a warning message (second display content) in the screen of the center console for the same warning message (information data set). The information data set does not have to be static here, that is to say invariable. It can also be updated, for example, by sensor data of sensors of the motor vehicle and/or by data, for example, from the Internet or some other vehicle-external data source.

So that it is then clear to the driver in this context that the two display contents which are displayed in different regions of the passenger compartment are associated, according to the embodiment a signaling device is provided which is configured to generate at least one optical signal, which signals the exchanging of the information data set, in the passenger compartment. The optical signal therefore makes it visible that two applications have just synchronized their display content.

The applications can output their display contents on a common display device. In particular for this case one embodiment provides that the signaling device comprises a lighting symbol which lights up and/or flashes and/or changes its illumination color in order to generate an optical signal. The lighting symbol can then be implemented, for example, by an icon on a screen or else by a lamp, for example a light-emitting diode.

A further advantage is obtained if the signaling device is configured to generate a lighting effect which moves in the passenger compartment and which indicates through its movement that direction in which the information data set is exchanged. Then, at the same time it is signaled that the more up-to-date and/or more extensive information is located in the direction of movement.

The signaling of the exchange of data between two applications is desirable in particular if at least two display devices which are arranged structurally separate from one another are made available and the applications are configured to display their display contents on another of the display devices in each case. In the example of the navigation assistance which is described above, for example a moving symbol, which moves from the screen of the navigation assistance device to the head-up display, can be displayed to the driver as an optical signal for the synchronization, for example after the calculation of the route. It is then clear to the driver that the calculation of the route is ended and that the arrow which is displayed on the head-up display relates to the route to the new destination.

In order in this context to be able to generate a lighting effect even between the display devices, that is to say in a region where there is no screen at all, one embodiment provides a signaling device which comprises a plurality of lamps which are arranged in series between two display devices and is configured to switch on and/or switch off the lamps in series. As a result, a running light can be generated which indicates the direction of the exchange of data.

One embodiment in which the signaling device comprises a projection device which is configured to project a light spot and/or a lighting symbol onto a surface in the passenger compartment is even more flexible in terms of generation of the optical signal. The projection device can comprise a laser or a lamp with a shutter.

One embodiment utilizes one of the existing display devices to generate the optical signal. In this context, the signaling device comprises a windshield base display and is configured to generate a movable lighting effect, that is to say for example a moving symbol, which signals a direction in which the data set is exchanged, on the windshield base display.

It is equally possible for the signaling device to be configured to generate, on the at least one display device, a simple graphic symbol, that is to say for example an arrow or a symbol which moves between the display contents of the two applications.

According to one embodiment, a configuration device is provided in the motor vehicle, which configuration device is configured to optionally block or enable the synchronization of all the applications or of some predefined applications or of one predefined application as a function of a user input. The user can therefore switch off or switch on the exchange of data between the applications. This provides the user with the possibility of determining himself where and by which applications specific information is displayed in the passenger compartment.

The motor vehicle may be implemented as a car, in particular as a passenger car.

In the method for symbolizing the exchange of data between at least two applications, one of the applications firstly generates graphic data from an information dataset and displays it on at least one display device of a motor vehicle, and then another of the applications generates graphic data from the information data set and displays it on at least one display device, wherein, for the purpose of synchronization, the applications exchange the information data set with one another in the described way or mutually reference the information data set. At least one optical signal which signals the synchronization is generated by a signaling device in a passenger compartment of the motor vehicle. Additionally or alternatively to an optical signal, in the embodiment an acoustic signal can also generally be provided. This acoustic signal is suitable in particular if a user can perceive with it "migration" of an acoustic phenomenon, for example a sound or noise, from one display device to the other. This can be implemented, for example, by a volume control and/or phase control or by two or more than two loudspeakers. This method is also referred to as panning. In particular in the case of the optical and/or acoustic signal it is therefore possible to produce a location reference for a user in order to be able to determine the location of the associated display contents.

Developments of this method have features such as have already been described in relation to the developments of the motor vehicle. For this reason, a description of the corresponding developments of the method is not given here.

BRIEF DESCRIPTION OF THE DRAWINGS

These and other objects and advantages of the present invention will become more apparent and more readily appreciated from the following description of an exemplary embodiment, taken in conjunction with the accompanying drawings of which:

The single FIGURE (FIG.) shows a schematic illustration of an embodiment of the motor vehicle.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In the exemplary embodiment described below, the described components of the embodiment each present individual features which are to be considered independently of one another and which each also develop the invention independently of one another and are therefore also to be considered to be a component of the invention individually or in another combination than that shown. Furthermore, the described embodiment can also be supplemented by further features of the invention which have already been described.

The FIGURE shows an image sequence of four time periods S1 to S4 during operation of an embodiment of the method which is carried out by a motor vehicle 10. In each case a part of the passenger compartment 12 of the motor vehicle 10 is illustrated from the point of a view of a driver (not illustrated) of the motor vehicle 10. A combination instrument 16 with, for example, a tachometer 18 and a rotational speed display 20, can be arranged behind the steering wheel 14. The motor vehicle 10 can be a car, in particular a passenger car.

The motor vehicle 10 can have in the example shown three screens in a manner known per se, specifically a combination display 22 in the combination instrument 16 between the tachometer 18 and the rotational speed display 20, a center console screen 24 in a center console (not illustrated in more detail) of the car 10 and a windshield base display 26 which is arranged underneath a front windshield 28 and behind the combination instrument 16 in the longitudinal direction of the vehicle from the point of view of the driver. A display content of the three screens 22, 24, 26 can, for example, be controlled by a central processing unit 30. The display content is defined here by graphic data which can comprise, for example, graphic control instructions for controllers of the respective screen and image data with bit maps. The graphic data forms in each case a display content for a region of at least one of the screens 22, 24, 26. The graphic data can be generated, for example, in a manner known per se by control programs or applications 32, 34, 36 which are executed by the processing unit 30. In the example shown, the application 32 generates a display content for the combination display 22, the application 34 generates a display content for the center console screen 24, and the application 36 generates a display content for the windshield base display 26. However, it is also possible to provide that two or even more than two applications generate display contents for different regions of the same screen.

In the example shown, in S1, the driver can define for example a destination XYZ for a navigation assistance system by defining the name of the destination XYZ in an input field 38 on the center console screen 24 and subsequently activating, for example by actuating an operator control button 40, that is to say for example by clicking on the operator control button 40, with a cursor 42, the route calculation to the destination XYZ. The display of the input field 38 and of the operator control button 40 as well as the detection of the operator control with the mouse cursor 42 are carried out by the application 34 in a known way.

In order to direct the driver to the destination XYZ, navigation indications, for example an arrow for indicating the next driving maneuver, should be displayed in a manner known per se in the combination display 22 by the application 32.

For this purpose, after completion of the route calculation at a time t1, the application 34 can transmit an information packet 44 to the application 32 as shown in S2. The information packet 44 can comprise, for example, a list with the driving maneuvers to be displayed, i.e., the information packet 44 then comprises a complete information data set which is associated with the destination XYZ and from which a display content for the display on the combination display 22 is to be generated by the application 32. The information packet 44 can, however, also comprise, for example, just one indication in the form of an identification number, for example, by which the application 32 can then retrieve the actual information data set from a storage location.

The exchange of data takes place in the concealed fashion. For the user it is therefore firstly not apparent from which source new data comes. The applications are displayed in different display regions or different displays (combination instrument, windshield base display, central display).

So that when the first driving indication appears on the combination display 22 the driver can comprehend that this is information for the navigation assistance for the newly input destination XYZ, it is signaled to the driver in the motor vehicle 10 that the applications 32 and 34 are synchronizing, i.e., that the application 32 is also actually displaying instructions for driving maneuvers which are associated with the new destination XYZ.

As soon as the applications exchange data, this is symbolized optically in that, for example, a data exchange symbol (light, icon) moves from one application to the other. For this purpose, it is possible, for example using the application 36 and the windshield base display 26, to implement a signaling device which symbolizes the exchange of data of the information packet 44 between the applications 34 and 32.

At the time illustrated in S1, it is possible, for example during the inputting of the destination XYZ and the confirmation of the destination input by use of the operator control button 40, to display in the windshield base display 26 a symbol 46, for example a wave, via the center console screen 24 in the windshield base display 26 by the application 36. When the information packet 44 is emitted or transmitted by the application 34 to the application 32 as shown in S2, the symbol 46 is moved in the direction of the combination display 22 in the windshield base display 26 with, for example, a fluid or continuous movement 48. At a later time, t2, the symbol 46 therefore reaches a region above the combination display 22 as shown in S3.

After the symbol 46 has reached the region above the combination display 22, the display of driving instructions 50 (here for example a driving direction arrow and a distance indication) on the combination display 22 can then be started, for example at a time t3, by the application 32 as shown in S4 in a manner known per se. For example a road map, on which, for example, the entire route is marked, can then also be displayed on the center console screen 24.

The driver was able to clearly recognize from the moving symbol 46 that the driving instructions appearing on the combination display 22 at the time t3 have their origin or their source in the route calculation for the destination XYZ previously selected on the center console screen 24. As noted above, alternative embodiments to the moving symbol 46 include a series of lamps 52 arranged in series between two display devices 22, 24 and configured to switch on and/or switch off in series, and a projection device 54 configured to project a light spot and/or a lighting symbol onto a surface in the passenger compartment.

However, the driver may possibly not even wish that an application makes available data to another. In particular in the case of personal data switches, for example, telephone numbers, addresses or passwords, the exchange between random applications may be undesired. For example, it may be appropriate that a specific display content, for example a password, cannot be seen on any screen in the passenger compartment 12.

There can therefore be provision that the driver can define for all applications, or for individual selectable applications in, for example, a configuration menu of the Infotainment system, that no data can be emitted or specific data cannot be emitted, by a selected application to other applications or that no data can be received, or specific data cannot be received, by a selected application from said other applications.

Overall, with the motor vehicle 10 the advantage is thus obtained that the user is provided with more intuition and control with respect to an exchange of data between the applications executed in the motor vehicle 10.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A motor vehicle, comprising:
   at least one display device configured to display graphic information in a passenger compartment of the motor vehicle;
   at least one processor executing at least two graphic applications configured to generate, independently of one another, display contents for an information data set displayed on the at least one display device, the applications configured to synchronize with each other by at least one of exchanging the information data set and mutual referencing to the information data set, one of the applications generating first display content for the information data set displayed in a first region in the passenger compartment, and then another of the applications generating second display content for the information data set displayed in a second region in the passenger compartment; and
   a signaling device configured to generate in the passenger compartment at least one of an optical signal and an acoustic signal, different from the display contents, signaling synchronization of the applications.

2. The motor vehicle as claimed in claim 1, wherein at least two display devices are arranged structurally separate from one another and the applications are configured to display the display contents on different display devices, respectively.

3. The motor vehicle as claimed in claim 2, wherein the at least two display devices include at least two of a combination instrument, a windshield base display, a screen in a center console, a screen in a dashboard and a head-up display.

4. The motor vehicle as claimed in claim 3, wherein the signaling device comprises a lighting symbol which at least one of lights up, flashes and changes color in generating the optical signal.

5. The motor vehicle as claimed in claim 3, wherein the signaling device is configured to generate a lighting effect moving in the passenger compartment to indicate a direction in which the information data set is exchanged.

6. The motor vehicle as claimed in claim 1, wherein the at least one display device comprises at least one of a combination instrument, a windshield base display, a screen in a center console, a screen in a dashboard and a head-up display.

7. The motor vehicle as claimed in claim 1, wherein the signaling device comprises a lighting symbol which at least one of lights up, flashes and changes color in generating the optical signal.

8. The motor vehicle as claimed in claim 1, wherein the signaling device is configured to generate a lighting effect moving in the passenger compartment to indicate a direction in which the information data set is exchanged.

9. The motor vehicle as claimed in claim 1, wherein the signaling device comprises a plurality of lamps, arranged in series between two display devices, configured to at least one of switch on and switch off in series.

10. The motor vehicle as claimed in claim 1, wherein the signaling device comprises a projection device configured to project at least one of a light spot and a lighting symbol onto a surface in the passenger compartment.

11. The motor vehicle as claimed in claim 1, wherein the signaling device comprises a windshield base display and is configured to generate a movable lighting effect on the windshield base display, signaling a direction in which the information data set is exchanged.

12. The motor vehicle as claimed in claim 1, wherein the signaling device is configured to generate, on the at least one display device, a graphic symbol which points from one of the first and second regions to another of the first and second regions.

13. The motor vehicle as claimed in claim 1, wherein the signaling device signals the synchronization of the applications by an indicator to the second region from the first region.

14. The motor vehicle as claimed in claim 1,
    wherein a first application of the at least two graphic applications generates the first display content for the first region of the at least one display device, and
    wherein after the first application generates the first display content, the signaling device generates the at least one of the optical signal and the acoustic signal providing the signaling from the first region of the at least one display device to the second region of the at least one display device that the first application is synchronized with a second application of the at least two graphic applications, and the second application generates the second display content for the second region of the at least one display device.

15. The motor vehicle as claimed in claim 1,
    wherein the processor generates an old information data set referenced by first and second applications of the at least two graphic applications in generating first and second display content for the first and second regions, respectively, of the at least one display device,
    wherein after generating the old information data set, the processor generates an updated information data set and the first application generates updated first display content for the updated information data set and the first region of the at least one display device,
    wherein after the updated first display content is generated, the signaling device generates the at least one of the optical signal and the acoustic signal providing the signaling from the first region to the second region of the at least one display device, and
    wherein after generation of the signaling, the second application generates updated second display content for the updated information data set and the second region of the at least one display device.

16. The motor vehicle as claimed in claim 15, wherein the old information data set and the updated information data set relate to an output from a navigation system.

17. The motor vehicle as claimed in claim 15,
    wherein the first and second regions of the at least display device correspond respectively with structurally separate first and second display devices, and wherein the first display device comprises a user interface that receives information for the updated information data set from a user.

18. The motor vehicle as claim in claim 17, wherein the first display device comprises a screen of an infotainment system on which an operator control menu is presented to a user.

19. The motor vehicle as claimed in claim 1,
wherein the first and second regions of the at least display device correspond respectively with structurally separate first and second display devices,
wherein the signaling device generates an optical display on a windshield base display extending at least partially across a bottom of windshield, and
wherein the signaling device signals the synchronization with a wave symbol which travels across the bottom of the windshield on the windshield base display.

20. The motor vehicle as claimed in claim 1,
wherein the signaling device generates an optical display on a windshield base display extending at least partially across a bottom of windshield,
wherein the first region is located in a screen of an infotainment system functioning as a user interface,
wherein while information for the information data set is being entered by a user via the screen of the infotainment system, an indicator is shown above the screen of the infotainment system in the windshield base display,
wherein the second region is located in a second display device structurally separate from the screen of the infotainment system,
wherein after the information for the information data set has been entered via the screen of the infotainment system, the signaling device moves the indicator from above the screen of the infotainment system to a signaling area proximate to the second display device, and
wherein once the indicator reaches the signaling area, the second display content is generated for the information data set, on the second display device.

21. A method for symbolizing exchange of data between at least two applications, comprising:
generating first display content for an information data set by a first application;
displaying the first display content by the first application on at least one display device of a motor vehicle;
generating second display content for the information data set by a second application after said displaying of the first display content;
displaying the second display content by the second application on the at least one display device;
synchronizing the at least two applications by at least one of exchanging the information data set and mutual referencing to the information data set; and
generating at least one optical signal, indicating synchronization of the at least two applications, by a signaling device in a passenger compartment of the motor vehicle.

22. The method as claimed in claim 21,
wherein the at least one display device includes two structurally separate display devices,
wherein said displaying of the first display content is on a first one of the display devices and said displaying of the second display content is on a second one of the display devices, and
wherein said generating of the at least one optical signal provides a visually perceptive link between the two structurally separate display devices when the at least two applications are synchronized.

* * * * *